Inventors
J. Kruithof – L.J.G. Nys-
J.L.J. Donceel
By Robert Harding Jr.
Attorney Aug. 7, 1956 | J. KRUITHOF ET AL | 2,758,158

AUTOMATIC TELECOMMUNICATION SYSTEM WITH ABSENT SUBSCRIBER SERVICE

Filed Nov. 18, 1952

2 Sheets-Sheet 2

Inventors
J. Kruithof – L. J. G. Nys – J. L. J. Donceel

By Robert Harding Jr.

Attorney 2,758,158
Patented Aug. 7, 1956

2,758,158

AUTOMATIC TELECOMMUNICATION SYSTEM WITH ABSENT SUBSCRIBER SERVICE

Jakob Kruithof, Louis Jacques Ghislain Nys, and Jules Louis Joseph Donceel, Antwerp, Belgium, assignors to International Standard Electric Corporation, New York, N. Y., a corporation of Delaware Application November 18, 1952, Serial No. 321,126

Claims priority, application Netherlands November 26, 1951

2 Claims. (Cl. 179—27.54)

Figure 1:
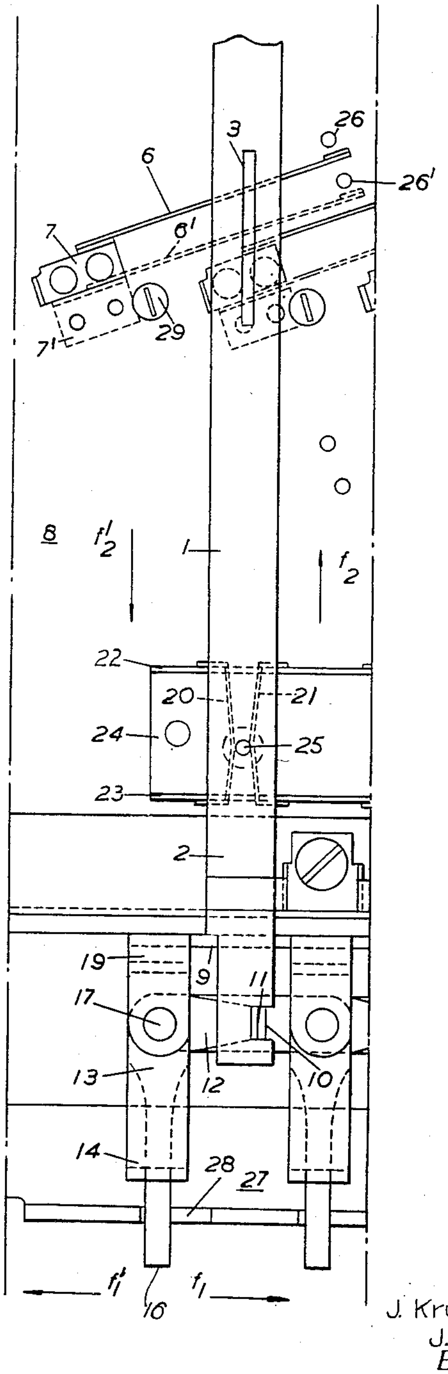

The invention relates to automatic telecommunication systems with absent subscriber service and more particularly refers to telecommunication systems using coordinate selectors with one or more separate sets of contacts per subscriber's line for the establishment of connections therewith.

Different types of coordinate selectors are known and, although the invention will be described in detail in conjunction with the type of coordinate selectors disclosed in our co-pending application Serial No. 280,252, filed April 3, 1952, the invention is not limited thereto.

In a coordinate switch of the type disclosed in the aforesaid copending application, a connection between an inlet of the switch and an outlet thereof, i. e. a subscriber's line circuit, is obtained by first displacing a select bar corresponding to said outlet, this displacement being followed by the displacement of an actuating and hold bar corresponding to the inlet whereby this will provoke the operation of a contact finger corresponding to the inlet and the outlet which it is desired to associate, whereby said contact finger will establish the desired connection which will remain established under the sole control of the actuating and hold bar maintained in its actuated position, whereas the select bar can be released. Both types of bars are controlled by electromagnets or combinations thereof.

In switching systems, it may be required that any line should be placed during a temporary period, which might however be substantially long, in a special electrical condition. Such is the case for the so-called "absentee" condition in which a special electrical condition is associated with a test conductor of the subscriber's line circuit so that if the latter is tested by a terminating call, this call is not completed to the line but is routed to an operator. This particular electrical condition, can be applied by remote control from a centralised absent subscriber service desk from which it can, of course, also be removed when necessary.

The absentee service should be available without any restriction to any number of subscribers simultaneously. This makes it immediately impossible to apply and maintain this special absentee condition by an ordinary terminal switch, since one would have to provide a number of such switches equal to the number of subscribers.

The Belgian Patent No. 502,519 already provides a solution to this problem in relation to a multi-switch of the type disclosed in our aforesaid co-pending application.

Assuming that the multi-switch provides access from a plurality of inlets to 100 outlets constituted by the subscriber's line circuit, this can be obtained by using 50 select bars, each of which corresponds to two outlets, and a number of actuating and hold bars which is equal to the number of inlets and which can be displaced in two opposite directions. In this manner, when it is desired to select an outlet, the select bar corresponding to the two outlets, one of which is the desired one, will first be displaced and this operation will be followed by the displacement of the actuating and hold bar corresponding to the inlet in a direction corresponding to the desired outlet out of the two selected by the select bar, whereby the operation of the actuating and hold bar in said first direction, will result in the displacement of the contact finger corresponding to said actuating and hold bar and to the select bar, in a corresponding direction, resulting in the connection of the desired outlet. The multi-switch is thus seen to be formed out of a plurality of individual switches, each of which has a corresponding actuating and hold bar operable in two opposite directions, and a set of 50 contact fingers which are designed to bring about the actual connection between the inlet and one of the 100 outlets. The inlet conductors extend substantially perpendicular to the contacting fingers and can be displaced, at the points where they cross the contact fingers, into contact with the outlet conductors which are arranged substantially perpendicularly to both the inlet conductors and the contacting fingers. What may be termed the odd outlet conductors are located on one side of the inlet conductors whereas what may be termed the even outlet conductors are located on the other side, whereby the displacement of a contact finger in one direction will produce contact with a corresponding odd outlet, whereas the displacement of said contact finger in the opposite direction will cause contact with the corresponding even outlet.

In the said Belgian Patent No. 502,519 two special individual switches were provided for absentee service. Each of these switches comprised an actuating bar and a set of 50 contact fingers. "Actuating bar" is used here to distinguish from the normal actuating and hold bars, since, as will be seen later, these actuating bars do not perform a holding function. Further, every contact finger of these specal individual switches is provided with individual holding means.

In this manner, when it is desired to bring a particular subscriber's line in the absentee condition, this line will first of all be preselected by means of the select bar which, apart from controlling the selection of the normal switches, also controls the selection of the two special switches, and the operation of this select bar, which in fact corresponds to two lines, one of which is the desired one, will be followed by the operation of that actuating bar, out of the two special ones, which corresponds to the line circuit to be brought in the absentee condition. These two successive operations will provoke the displacement of the corresponding contact finger whereby an individual contact can be closed on one of the test wires of the line circuit to be brought in the absentee condition. Suitable potentials can then be impressed on this particular test conductor, for example in the manner disclosed in Belgian Patent No. 500,639. Due to the individual holding means provided for each of the contact fingers used for absentee service, the actuating bar as well as the select bar can now be released and the desired connection will remain established, the contact finger remaining held by said individual holding means. In the Belgian Patent No. 502,519 the absentee condition was obtained on one line by displacing the required actuating bar in one direction and then returning it to normal and the withdrawal of the absentee condition was obtained by displacing the same actuating bar in the opposite direction and then returning it to normal. However, normal coupling between the bar and the fingers was used, i. e. a coupling identical to that used between the actuating and hold bars and their corresponding fingers. In this manner, a special design of the contact fingers was necessitated, since otherwise the return of the actuating bar to its normal position would have undone the previous operation and the contact fingers would have been moved against the force exerted by the individual holding mechanism. This was obtained by breaking the contact finger in two parts, one directly actuated by the actuating bar and the other directly operating the individual contact. Coupling between these two parts was so designed that, when the actuating bar was released to its normal position, the first part was drawn with it, but the second part which directly operated the individual contact, remained in the position previously attained.

In accordance with a characteristic feature of the invention, the contact fingers provided with individual holding means are similar to the ordinary contact fingers used for a normal connection between an inlet and an outlet which are normally maintained in their operated position under the control of the corresponding actuating and hold bar.

Figure 2:
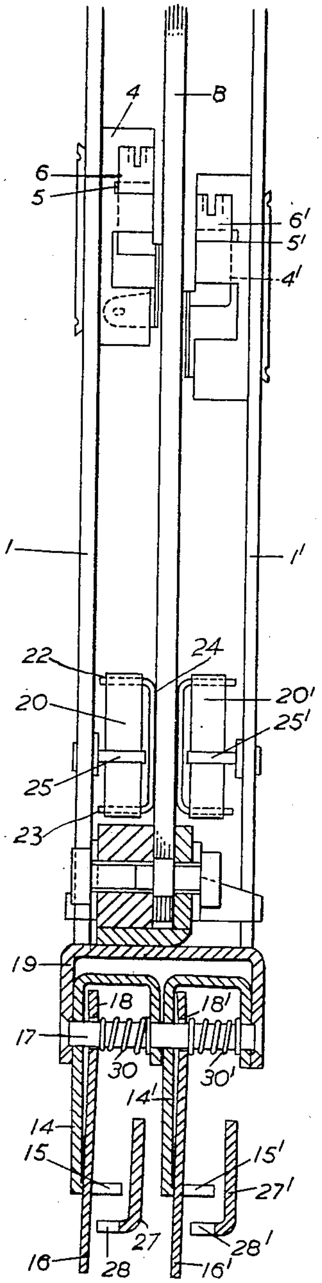

The invention will be better understood with reference to the following description of an embodiment taken in conjunction with the accompanying drawings, which represent:

Fig. 1, a plan view of a contact finger provided with individual holding means;

Fig. 2, a side view of the contact finger shown in Fig. 1.

Referring to Figs. 1 and 2, a contact finger 1 of the type disclosed in our aforesaid copending application, is shown and comprises a flat horizontal metal part 2, in which a slot 3 is provided for mounting a vertical insulated part 4 which is slotted at 5, as shown in Fig. 2, in order to drive a spring contact 6 in the form of a blade fixed at one end on a metal tag 7 fixed to the main insulated plate 8. A shoulder 9 is provided at one end of the finger 1 to limit its longitudinal displacement in one direction. Further, this end is slotted at 10 to permit the insertion of the upturned end 11 of the arm 12 of the bell crank lever 13, the other arm of which terminates into a vertically bent part 14 which is slotted at 15 to permit the insertion of a second lever 16, which is slightly bent as shown in Fig. 2 and able to pivot in a vertical plane around the holding pin 17, the diameter of which is sufficiently smaller than the diameter of the opening 18 provided in the second lever 16 to permit said vertical displacement. The pin 17 is also used as pivot for the first lever 13 which is able to rotate around this pin. The latter is mounted on a bracket formed by U-shaped part 19 and as shown in Fig. 2, is used in common for two sets of levers, each of which corresponding to a contact finger, i. e. 1 and 1'. Spring 30 is used to hold the lever 16 in its normal position shown in Fig. 2.

For each finger such as 1, an individual holding mechanism is provided which is constituted by two spring blades 20 and 21 which are bent as shown in Fig. 1 and held at both their ends in the upturned parts 22 and 23 of a U-shaped member 24 mounted on the insulated plate 8. A small vertical pin 25 is fixed to the contact finger 1 and can be displaced in the channel formed between the two holding spring blades 20 and 21.

Assuming it is desired to operate the contact spring 6 and effect connection between this spring and the vertical multiple conductor (not shown) which can be inserted in the hole 26 and forms the test conductor for the particular line which it is desired to bring in the absentee condition, the horizontal actuating bar 27 will be displaced in the direction of the arrow $f_1$. This will, of course, occur after the select bar (not shown), corresponding to the contact finger 1, has first been displaced in such a manner that it has caused the lever 16 to be deflected downward within the slot 28 provided for each finger in the upturned part of the actuating bar 27. The movement of this bar in the direction of the arrow $f_1$, will therefore cause this lever 16 to be driven anticlockwise around the pivot 17 and in so doing, it will displace with it the first lever 13, the upturned end 11 of which will cause the finger 1 to be pushed in the direction of the arrow $f_2$. The displacement of the finger 1 will be sufficient to carry the small pin 25 beyond the midpoint of the holding spring blades 20 and 21, so that this pin will now be located in a symmetrical position with respect to that shown on the figure, in relation to the midpoints of the springs 20 and 21. The desired contact between the spring 6 and the vertical conductor inserted in the hole 26 will have been accomplished. In the usual manner, the select bar (not shown) can, of course, be released, but the finger 1 will be retained in its actuated position due to the action exerted by the spring blades 20 and 21, while the actuating bar 27 can also be released and returned to the position shown in the drawing.

It is seen on Fig. 1, that the slot 28 is asymmetrically located with respect to the second lever 16 so that, when the actuating bar 27 is released, it will not co-operate with the lever 16 and the latter together with the first lever 13 and the contact finger 1 will be left in their operated positions maintaining the corresponding line in the desired absentee condition without any common equipment being held busy.

If it is now desired to return the line to its normal condition by breaking the connection between contact 6 and the multiple test conductor of the line inserted in the hole 26, the actuating bar 27 will now be driven in the direction of the arrow $f'_1$ and as the lever 16 is still in its displaced position whereas the actuating bar 27 is in the position shown, the right-hand part of the slot 28 will this time drive the lever 16 in a clockwise direction causing a similar rotation of the lever 13 and hence the return of both levers and the contact finger 1 to the position shown, the pin 25 travelling in the direction of the arrow $f'_2$ against the holding action exerted by the spring blades 20 and 21. This displacement of the actuating bar 27 will have again been preceded by the displacement of the proper select bar which can now be released. It is to be noted that the extensions provided on said select bar (not shown) to depress the lever 16 should be sufficiently wide to be able to catch that lever, either in the position shown or in the actuated position, when said lever is displaced to the right.

The actuating bar 27 can also be released and the finger 1 will remain in its non-operated position as shown.

If the multi-switch serves 100 subscriber lines, each actuating bar such as 27, will be used to co-operate with 50 contact fingers such as 1, and the actuating bar 27' will be used to co-operate with 50 fingers such as 1' for which the contact extensions such as 6' are mounted on a tag 7' on the opposite side of the insulated plate 8, a hole 29 being provided near said tag 7' to permit the connection of electrical components to the terminals such as 7 and 7' while locating all the electrical components on the one side of the insulated plate 8.

If, as disclosed in our aforesaid copending application, each select bar corresponds to four lines, which means that each actuating and hold bar co-operates with 25 fingers only, then the actuating bars such as 27 will also co-operate with 25 fingers only and four of such bars will be necessary to obtain access to anyone of the 100 subscribers' lines, i. e. two double units such as that shown in Fig. 2 will be used superposed on one another in the same manner as the individual switch units forming the multi-switch are piled up.

While the principles of the invention have been described above in connection with specific apparatus, it is to be clearly understood that this description is made only by way of example and not as a limitation on the scope of the invention.

What is claimed is:

1. A multi-switch of the cross-bar type for use in telecommunication systems comprising a set of first conductors, a set of movable second conductors perpendicular to said first conductors, a plurality of contact fingers perpendicular to both sets of said conductors, said fingers adapted to guide given of said second conductors into contact with given of said first conductors, common means for actuating said fingers, clutch means for selectively coupling said finger with said actuating means, and a plurality of detent means each individual to a different one of said fingers for maintaining said fingers in an operated position after release of said clutch means independent of said actuating means, and means for releasing an operated finger from its associated detent means upon re-engagement of said clutch means and actuation of said operated finger in an opposite direction under control of said actuating means.

2. A multi-switch of the cross-bar type as claimed in claim 1, wherein each of said detent means comprises a separate pin affixed to each of said fingers, a plurality of pairs of spaced cooperating spring blades each pair fixedly mounted with respect to the pin in the associated finger, each pair of said spring blades partially extending in the path of the pin affixed to the associated finger, the spacing between blades of a pair being smaller than the thickness of said pin, said blades adapted to be flexed upon passage of said pin therebetween and to resiliently bar passage of said pin therethrough except when said finger is actuated by said actuating means.

References Cited in the file of this patent

UNITED STATES PATENTS

| | | |
|---|---|---|
| 2,082,911 | Schneckloth | June 8, 1937 |
| 2,358,095 | Parker | Sept. 21, 1944 |
| 2,479,678 | Graybill et al. | Aug. 23, 1949 |
| 2,653,486 | Bracke et al. | Sept. 29, 1953 |